(12) United States Patent  
Mentink

(10) Patent No.: US 6,508,503 B2  
(45) Date of Patent: Jan. 21, 2003

(54) HYDRAULIC ACTUATING DEVICE FOR A FOLDING ROOF OF A MOTOR VEHICLE

(75) Inventor: Laurentius Andreas Gerardus Mentink, Haaksbergen (NL)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 09/970,285

(22) Filed: Oct. 3, 2001

(65) Prior Publication Data

US 2002/0134229 A1 Sep. 26, 2002

(30) Foreign Application Priority Data

Oct. 10, 2000 (NL) ............................................. 1016373

(51) Int. Cl.[7] .............................. F16D 31/02; B60J 7/12
(52) U.S. Cl. .................... 296/117; 296/107.08; 60/429; 60/476
(58) Field of Search ........................... 296/107.08, 117; 60/428, 429, 476

(56) References Cited

U.S. PATENT DOCUMENTS

| | | | | |
|---|---|---|---|---|
| 2,657,533 A | * | 11/1953 | Schanzlin et al. | 60/52 |
| 5,666,873 A | * | 9/1997 | Lindmayer et al. | 91/511 |
| 5,724,878 A | * | 3/1998 | Stolle et al. | 91/165 |
| 5,737,992 A | * | 4/1998 | Torrekens et al. | 91/59 |
| 5,760,695 A | * | 6/1998 | Huber | 340/614 |
| 6,039,382 A | * | 3/2000 | Mather et al. | 296/107.01 |
| 6,149,221 A | * | 11/2000 | Mentink | 296/117 |
| 6,397,592 B1 | * | 6/2002 | Baumert et al. | 60/423 |

FOREIGN PATENT DOCUMENTS

| | | |
|---|---|---|
| EP | 0 693 390 A1 | 1/1996 |
| EP | 0 941 882 A1 | 9/1999 |

* cited by examiner

Primary Examiner—D. Glenn Dayoan  
Assistant Examiner—Paul Chenevert  
(74) Attorney, Agent, or Firm—Quarles & Brady LLP

(57) ABSTRACT

A hydraulic actuating unit for integration into a preassembled folding roof unit of a motor vehicle is adapted for mounting as a single unit in a motor vehicle with the hydraulic actuating unit integrated therein. The preassembled folding roof unit has a folding roof with a foldable cover and a framework for the cover. A main bow is pivoted by a hydraulic main bow actuator and a rear bow is pivoted by a hydraulic rear bow actuator, each actuator being of the double-acting type. The hydraulic actuating unit also has an actuable two-position control valve, which control valve has an outlet port, an inlet port and a reservoir port, the outlet port being connected to a working chamber of the main bow actuator and/or a working chamber of the rear bow actuator. The control valve, in a first position, connects the associated outlet port to the reservoir port and, in a second position, connects the associated outlet port to the inlet port of the control valve. The hydraulic actuating unit also has two hydraulic connection ports to connect the actuating unit, which is integrated in the pre-assembled folding roof unit, to a hydraulic pump/reservoir unit, which is mounted away from the actuating unit. A valve element with a non-return valve action opening towards the relevant connection port is provided in the connection between the reservoir ports and the connection ports.

17 Claims, 2 Drawing Sheets

HYDRAULIC ACTUATING DEVICE FOR A FOLDING ROOF OF A MOTOR VEHICLE

FIELD OF THE INVENTION

The invention relates to the hydraulic actuation of a folding roof of a motor vehicle, such as a passenger car of the cabriolet type.

In particular, the present invention relates to a hydraulic actuating unit which is designed to be integrated in a preassembled folding roof unit, which in turn is designed to be mounted in a motor vehicle as a single unit with the actuating unit integrated therein. In this case, the said preassembled folding-roof unit comprises a folding roof with a foldable cover and, for example, with a rear window and, furthermore, a framework for supporting the cover. The framework comprises a pivotable main bow, which can move between a pivoted-up position and a pivoted-down position, and a pivotable rear bow for moving a rear section of the folding roof. The hydraulic actuating unit comprises a hydraulic main bow actuator for pivoting the main bow, and a hydraulic rear bow actuator for pivoting the rear bow.

BACKGROUND OF THE INVENTION

A hydraulic actuating unit adapted for integration into a preassembled folding roof unit of a motor vehicle, which preassembled folding roof unit in turn is adapted for mounting as a single unit in a motor vehicle with the hydraulic actuating unit integrated therein, is known from U.S. Pat. No. 6,149,221 (first described in NL Pat. No. 1,008,455) in the name of the present applicant.

In this known hydraulic actuating unit, there are, as is customary, two main bow actuators, which are connected hydraulically in parallel, and two rear bow actuators, which are connected hydraulically in parallel. To control the movement of these actuators, in the known actuating unit three electromagnetically actuable 3/2-control valves are incorporated in the known actuating unit. Furthermore, there is a hydraulic AND valve which—as explained in NL 1008455—allows the number of relatively expensive electromagnetically actuated control valves to be reduced.

An advantageous aspect of the known actuating unit is that only two connecting lines are required between the said actuating unit, on the one hand, and the pump/reservoir unit, on the other hand, which is mounted at a different location, for example in or in the vicinity of the boot space, in the motor vehicle. It is known for these connecting lines to be completely or partially designed as flexible hydraulic hoses.

OBJECT OF THE INVENTION

It is an object of the present invention to propose measures which further improve the hydraulic actuating unit which is to be integrated in the preassembled folding-roof unit, without it being necessary to increase the number of connecting lines to the pump/reservoir unit, so that two connecting lines are sufficient. In particular, it is an object of the invention to propose measures which allow further simplification of the said hydraulic actuating unit, so that it is preferably possible to achieve a reduction in cost price.

SUMMARY OF THE INVENTION

The present invention provides a hydraulic actuating unit for integration into a preassembled folding roof unit of a motor vehicle.

Said preassembled folding roof unit comprises a folding roof with a foldable cover and a framework for the cover, which framework comprises a pivotable main bow, which is moveable between a pivoted-up position and a pivoted-down position, and a pivotable rear bow for moving a rear section of the folding roof.

The hydraulic actuating unit comprises a hydraulic main bow actuator for pivoting the main bow and a hydraulic rear bow actuator for pivoting the rear bow, the main bow actuator and the rear bow actuator being of the double-acting type, each having a first and a second variable working chamber, which are delimited by a piston of the hydraulic actuator in question.

The hydraulic actuating unit also comprises at least one actuable two-position control valve, which control valve has an outlet port, an inlet port and a reservoir port, the outlet port being connected to a working chamber of the main bow actuator and/or a working chamber of the rear bow actuator, and which control valve, in a first position thereof, connects the associated outlet port to the reservoir port and, in a second position thereof, connects the associated outlet port to the inlet port of the control valve.

The hydraulic actuating unit has two hydraulic connection ports, namely a first connection port, which is in communication with the inlet port of at least one actuable two-position control valve, and a second connection port, which is in communication with the reservoir port of each control valve.

The first connection port and the second connection port of the hydraulic actuating unit are each provided with a coupling element for coupling said connection port to a corresponding coupling element, which is in communication with a hydraulic circuit.

In the hydraulic circuit at least one hydraulic pump/reservoir unit is incorporated, said pump/reservoir unit being adapted for mounting in the motor vehicle at a distance from the hydraulic actuating unit which is integrated in the folding roof unit.

The hydraulic pump/reservoir unit comprises at least one reservoir for hydraulic fluid and a pump which is connected to the reservoir for delivering pressurized hydraulic fluid.

According to the invention in the hydraulic actuating unit the reservoir port of each control valve is also connected to the first connection port. Furthermore a valve element with a non-return valve action opening towards the relevant connection port is provided in the connection between each reservoir port and the first connection port and in the connection between each reservoir port and the second connection port.

The last-mentioned measures lead to a saving of at least one (expensive) electromagnetic valve in the hydraulic actuating unit, which is integrated in the preassembled folding-roof unit, compared to the abovementioned prior art.

The present invention also relates to a preassembled folding-roof unit in which a hydraulic actuating unit of this type is integrated, and to a folding-roof installation which, in addition to the said folding-roof unit, comprises one or more further components, such as for example a (hydraulically drivable) tonneau-cover for covering a compartment for accommodating the open folding roof.

The present invention also relates to a motor vehicle, in particular a passenger car of the cabriolet type, having a folding roof which can be actuated by means of an associated hydraulic actuating device according to the invention.

The invention, as well as advantageous embodiments and advantages thereof, are described in more detail in the following description with reference to a preferred embodiment.

DETAILED DESCRIPTION OF PREFERRED EMBODIMENT

Figure 1:
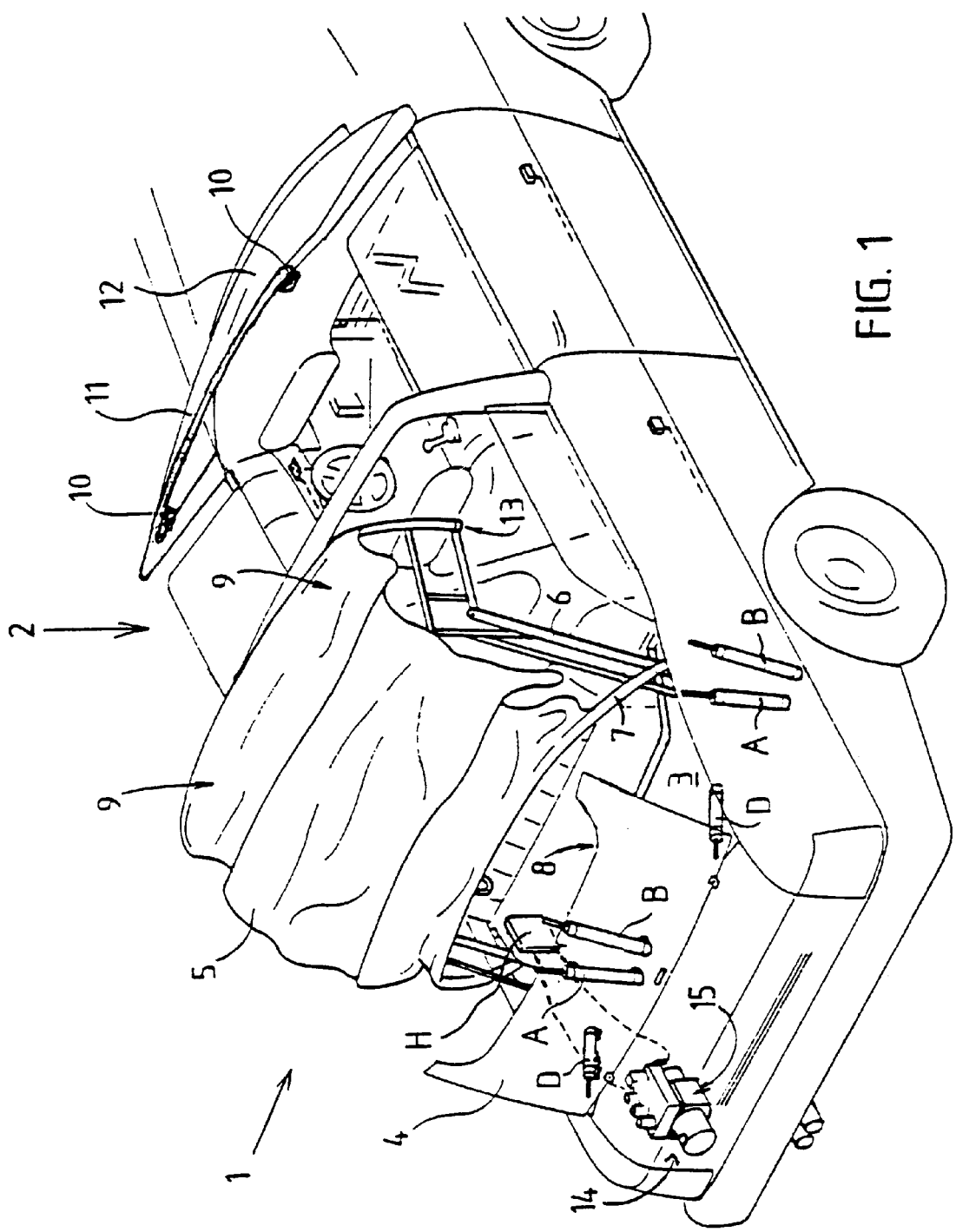
FIG. 1 shows a perspective view of a motor vehicle of the cabriolet type, in which the folding roof is partially open and the hydraulic actuators of a preferred embodiment of the hydraulic actuating device according to the invention are diagrammatically indicated.

FIG. 1 shows a motor vehicle 1 of the cabriolet type, with a body and a passenger compartment 2 therein. The motor vehicle 1 has a folding-roof installation with a folding roof for covering the passenger compartment 2 and a hydraulic actuating device for moving the folding roof between a closed position, in which the folding roof covers the passenger compartment 2 of the motor vehicle 1, and an open position, in which the passenger compartment 2 is not covered.

Behind the passenger compartment 2, the body of the motor vehicle 1 has a compartment 3 for accommodating the folding roof in the open position.

The folding-roof installation also comprises a tonneau-cover 4 which can be pivoted up and down for the purpose of closing off the compartment 3.

The folding roof has a foldable cover 5 and a framework which can be folded together for the cover 5. The framework comprises, inter alia, a main bow 6, which can be moved by the actuating device between a pivoted-up position and a pivoted-down position, and a pivotable rear bow 7, for moving a rear section of the cover 5 of the folding roof. The rear bow 7 can be moved, by the actuating device, between a pivoted-up position, in which the rear bow 7 lies more or less alongside the main bow 6, as can be seen in FIG. 1, and a position in which it is pivoted away from the main bow.

For the purpose of locking the tonneau-cover 4 in the position in which it closes off the compartment 3, a tonneau-cover lock (not shown) is provided at 8. In order to lock the folding roof in the closed position, two folding-roof locks are provided at the front edge of the folding roof, at 9, which locks are able to interact with locking recesses 10 in bar 11 above windscreen 12 of the motor vehicle 1. The locks may, for example, be locks which are known per se and are operated manually or electrically.

The folding roof illustrated is of a known type, of which that part which adjoins the front edge of the folding roof can pivot upwards about a pivot axis 13 with respect to that part of the folding roof which lies behind it. This pivoting of the front part of the folding roof is effected by a mechanical coupling between the said front part and the rear part of the folding roof, which is moved by the rear bow 7.

The hydraulic actuating device comprises a plurality of hydraulic actuators, namely a pair of main bow actuators A for pivoting the main bow 6, a pair of rear bow actuators B for pivoting the rear bow 7, and a pair of tonneau-cover actuators D for the tonneau-cover 4.

Figure 2:
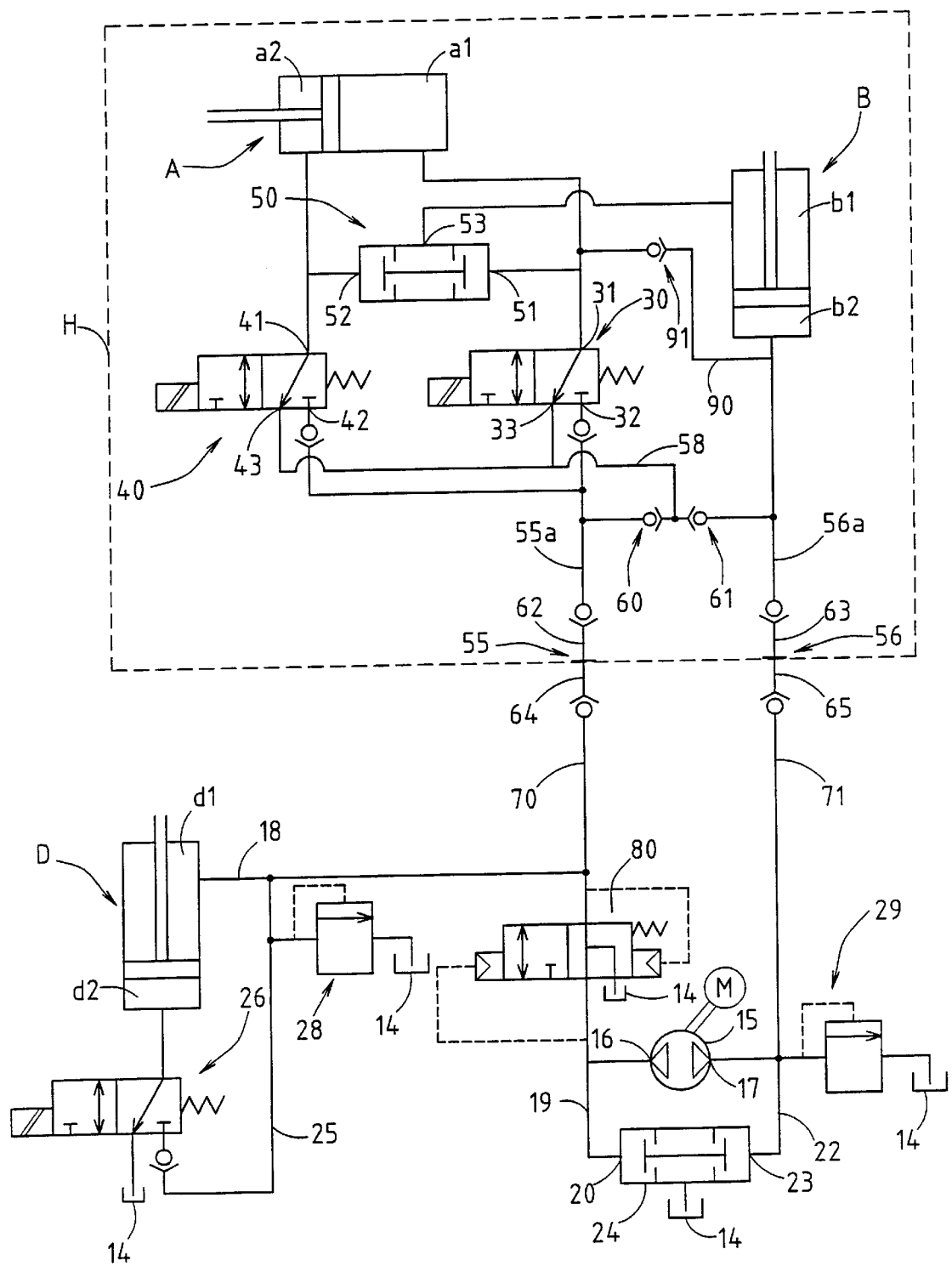
FIG. 2 shows the hydraulic circuit diagram of the preferred embodiment of the hydraulic actuating device according to the invention.

The main bow actuators A, the rear bow actuators B and the cover actuators D are in this example linear piston/cylinder devices of the double-acting type, each with a first variable working chamber and a second variable working chamber, which are separated from one another by a piston of the relevant actuator and are respectively denoted by a1, a2, b1, b2 and d1, d2 (cf. FIG. 2). The actuators of each pair are connected hydraulically in parallel, in a known way, and consequently, for the sake of simplicity, the description which follows will at each instance refer to only one actuator of each pair.

The hydraulic actuating device also comprises a reservoir 14 for hydraulic fluid and a pump 15.

For a detailed description of the preferred embodiment of the hydraulic actuating device of the motor vehicle 1 shown in FIG. 1, reference will now be made to FIG. 2.

A dashed outline in FIG. 2 indicates which components form part of the hydraulic actuating unit, denoted by H in FIGS. 1 and 2, which is intended to be integrated in a preassembled folding-roof unit, which folding-roof unit, during assembly of the motor vehicle, is then supplied as a single unit to the assembly line and is fitted to the motor vehicle as this single unit. The preassembled folding-roof unit then furthermore comprises the folding roof with the foldable cover and the framework for the cover. The framework comprises the pivotable main bow and the pivotable rear bow.

The hydraulic actuating unit which is also integrated in the preassembled folding-roof unit comprises the hydraulic main bow actuator A for pivoting the main bow and the hydraulic rear bow actuator B for pivoting the rear bow.

The hydraulic actuating unit also includes a first and a second electromagnetically actuable spring-return two-position control valve, preferably a 3/2 ball valve, respectively denoted by reference numerals 30 and 40. Each control valve 30, 40 has an outlet port 31, 41, an inlet port 32, 42 and a reservoir port 33, 43.

The outlet port 31 of the first control valve 30 is connected to the first working chamber a1 of the main bow actuator A, and the outlet port 41 of the second control valve 40 is connected to the second working chamber a2 of the main bow actuator A.

When hydraulic fluid is supplied to the first working chamber a1, the main bow moves towards its closed position, in which the folding roof is closed, while when hydraulic fluid is supplied to the working chamber a2, the main bow moves towards its open position.

When hydraulic fluid is supplied to the first working chamber b1 of the rear bow actuator B, this rear bow pivots upwards, while when hydraulic fluid is supplied to the working chamber b2 the rear bow pivots downwards.

In the illustrated first or unenergized position, each of the control valves 30, 40 connects the associated outlet port 31, 41 to the reservoir port 33, 43. In the second, or energized, position, the outlet port 31, 41 is connected to the inlet port 32, 42 of the relevant control valve 30, 40.

The hydraulic actuating unit also comprises a hydraulic AND valve 50, having a first and a second inlet port 51, 52 and having an outlet port 53, the inlet ports 51, 52 of the AND valve 50 being respectively connected to the outlet ports 31, 41 of the first and second actuable control valves 30, 40, and the outlet port 53 of the AND valve being connected to the first working chamber b1 of the rear bow actuator B.

The hydraulic actuating unit also comprises a first hydraulic connection port 55 with a line 55a connected to it, which line is connected to the inlet ports 32, 42 of the first and second actuable two-position control valves 30, 40. A second hydraulic connection port 56 is also provided, having an associated line 56a which is connected to the second working chamber b2 of the rear bow actuator B.

The reservoir ports 33, 43 of the two control valves 30, 40 are connected to a common return line 58. The return line 58 is connected both to the line 55a and to the line 56a.

In this case, non-return valves 60, 61 have the effect of ensuring that a valve element with a non-return valve action which opens in the direction towards the relevant connection port 55, 56 is present between the first connection port 55 and each of the reservoir ports 33, 43 and between the second connection port 56 and each of the reservoir ports 33, 43.

As an alternative to the use of two non-return valves 60, 61, it is also possible to provide a single valve, such as the valve 24 or an AND valve.

The hydraulic actuating device of the folding-roof assembly also comprises a hydraulic pump/reservoir unit. This pump/reservoir unit comprises at least the reservoir 14 for hydraulic fluid, and the pump 15, which is connected to the reservoir 14, for delivering pressurized hydraulic fluid.

It can be seen from FIG. 2 that, in this example, the pump 15 is a reversible hydraulic pump which is driven by an electric motor M with two directions of rotation, for example is a radial plunger pump, with a first pump port 16 and a second pump port 17. The pump ports 16 and 17 are therefore, depending on the direction of rotation of electric motor M, either a suction port for sucking hydraulic fluid out of the reservoir 14 or a pressure port for delivering pressurized hydraulic fluid to the actuators A, B and D.

The first pump port 16 is connected, via a line 19, to port 20 of a suction shuttle valve 24, which in turn is in communication with the reservoir 14.

The second pump port 17 is connected, via a line 22, to port 23 of the suction shuttle valve 24, which is connected to the reservoir 14.

The pump/reservoir unit is mounted on the vehicle at a distance from the above-described folding-roof unit, for example in or in the vicinity of the boot space of the vehicle.

The pump/reservoir unit may comprise only the above-mentioned pump and reservoir, but in practice will often be integrated in a hydraulic circuit with one or more other components, in particular with one or more other hydraulic actuators (such as, in this example, the tonneau-cover actuators D and associated control valve 26).

Preferably, the pump/reservoir unit, together with any other components which have been integrated with it, will be supplied to the assembly line for the vehicle separately from the hydraulic actuating unit which has already been integrated in the preassembled folding-roof unit. In this case, the two units may be connected to one another prior to final assembly on the vehicle, but this may also take place while one or both of the said units are being mounted on the vehicle or even after this has taken place.

It can be seen in FIG. 2 that the first connection port 55 and the second connection port 56 of the hydraulic unit which is to be integrated in the preassembled folding-roof unit are each provided with a first coupling element 62, 63. These coupling elements 62, 63 can each be coupled to a corresponding second coupling element 64, 65, which second coupling elements 64, 65 form part of the hydraulic circuit in which the said pump/reservoir unit is incorporated.

The coupling elements 64, 65 are respectively in communication with the first pump port 16 and the second pump port 17, via associated lines 70, 71.

The coupling elements 62, 63, 64, 65 may be quick-fit couplings. In this case, it is advantageous for these coupling elements to be of the known type with internal shut-off means, which shut-off means close off the two coupling elements as soon as the coupling elements are detached. However, the coupling elements 62–64 may, for example, also form a threaded joint or a connection with a union nut or a plug-fit coupling. In this case, the fitting or removal may require the use of a tool, and it is even conceivable for a coupling which has been produced to be unreleasable, for example by using a press fit.

The essential feature of the coupling elements is that the hydraulic actuating device can be manufactured in two separate units, which are subsequently connected to one another in a later stage, after a unit has been integrated with the folding-roof unit. Preferably, these units are only filled with hydraulic fluid during production. These units, one of which is integrated in a larger folding-roof unit, are only connected to one another, by connecting the coupling elements to one another, during the assembly of the motor vehicle.

In practice, it is preferable for the two hydraulic lines which form the connection between the hydraulic actuating unit, on the one hand, and the pump/reservoir unit, on the other hand, to be at least partially designed as flexible hydraulic hoses.

In the circuit diagram shown in FIG. 2, this may involve the lines 55*a* and 56*a* being partially designed as hoses of this type, and the coupling elements 62, 63 being fitted to the end of these hoses. The lines 70, 71 may then, by way of example, be passages which are formed in a connection block, which is preferably integral with the pump/reservoir unit.

However, it is also conceivable for the ports 55 and 56 to be integral with a connection block in which, furthermore, the valves of the hydraulic actuating unit are preferably integrated or where one or more of these valves are arranged. In this case, the lines 70, 71 may in fact be partially designed as hoses. In a further variant, both the lines 55*a*, 56*a* and the lines 70, 71 are partially designed as hoses.

Obviously, the tonneau-cover actuator D is arranged at the tonneau-cover 4, and for this reason it is not incorporated in the preassembled folding-roof unit.

When hydraulic fluid is supplied to the first working chamber d1, the tonneau-cover 4 moves towards its closed position, and when hydraulic fluid is supplied to the working chamber d2, the tonneau-cover 4 moves towards its open position.

The working chamber d1 of tonneau-cover actuator D is connected, via a line 18, to the line 70 leading to the first pump port 16. The other working chamber d2 is also in communication with this line 18, via a branch line 25. An electromagnetically actuable control valve 26 of the type which has been extensively described above is incorporated in this line 25 and is able to connect the working chamber d2 to the line 18 or to the reservoir 14, as desired.

Furthermore, in FIG. 2 a pressure relief valve 28 is shown on the side of the pump port 16, and a pressure relief valve 29 is shown on the side of the pump port 17.

To allow emergency operation of the folding roof, for example in the event of a fault in the pump 15, a valve 80 is provided in the line 70. In this example, this valve 80 is hydraulically actuated and therefore acts automatically without requiring electrical or manual activation of the valve 80.

When pressurized hydraulic fluid is delivered from the pump port 16 to the line 70, the valve 80 adopts a position in which the valve 80 forms a passage in the line 70. When the flow of fluid drops away and in the event of flow in the reverse direction, the valve 80 adopts its other position, and the line 70 is connected to the reservoir 14. In the event of a fault in the pump, the valve 80 will therefore automatically connect the line 70 to the reservoir 14, so that the folding roof and the tonneau-cover 4 can be moved manually.

FIG. 2 also reveals a line 90, which forms a connection between the second working chamber b2 and the outlet port 31 of the valve 30. A non-return valve 91 which closes towards the second working chamber b2 is incorporated in this line 90. In the event of manual emergency operation of the tonneau-cover 4, fluid can flow out of the second working chamber b2, via this line 90, to the reservoir 14.

The sequence of movements for the folding roof when closing the folding roof and the associated actuation of the pump and the actuable control valves are as follows:

1. open tonneau-cover—port 16 is pressure port and valve 26 is energized,
2. main bow to closed position—port 16 is pressure port and valves 26 and 30 are energized,
3. rear bow upwards—port 16 is pressure port and valves 26, 30 and 40 are energized,
4. close tonneau-cover—port 16 is pressure port and valves 30 and 40 are energized,
5. rear bow downwards—port 17 is pressure port and valve 30 is energized.

The sequence of movements for the folding roof during the opening of the folding roof, and the associated actuation of the pump and actuable control valves, are as follows:

1. rear bow upwards—port 16 is pressure port and valves 30 and 40 are energized,
2. open tonneau-cover—port 16 is pressure port and valves 26, 30 and 40 are energized,
3. rear bow downwards—port 17 is pressure port and valves 26 and 30 are energized,
4. main bow towards open position—port 16 is pressure port and valves 26 and 40 are energized,
5. close tonneau-cover—port 16 is pressure port and valve 40 is energized.

The hydraulic actuating device illustrated ensures that the rear bow can move freely when the main bow is being actuated.

If the sequence of movements is temporarily interrupted as a result of the pump 15 coming to a standstill, the valves employed mean that all the actuators are hydraulically held in the positions which they are in at that time.

It will be clear to the person skilled in the art that, inter alia, choosing to operate the double-acting main bow actuator and/or rear bow actuator in such a manner that in each case one working chamber is connected to the pump and the other is connected to the reservoir, so that the maximum available force can be evolved, or in such a manner that both working chambers of the actuator are connected to the pump, allows a different design to be implemented for the valve system which is integrated in the hydraulic actuating unit. Therefore, it will also be possible that, in combination with the inventive idea, only a single actuable two-position control valve will be required. In this context, however, the inventive idea, which has been extensively explained, is still of advantage.

Furthermore, it will be clear that, if desired, the circuit diagram may be expanded by additional hydraulic actuators, for example for actuating the locks for the folding roof or the tonneau-cover. It will also be clear that the inventive idea is implemented if the tonneau-cover 4 is actuated in a different way rather than by the hydraulic tonneau-cover actuators D described, for example using an electromechanical drive device. In that case, the tonneau-cover actuator D can be omitted from the circuit diagram shown in FIG. 2.

What is claimed is:

1. A hydraulic actuating unit adapted for integration into a preassembled folding roof unit of a motor vehicle, which preassembled folding roof unit in turn is adapted for mounting as a single unit in a motor vehicle with the hydraulic actuating unit integrated therein, wherein said preassembled folding roof unit comprises a folding roof with a foldable cover and a framework for the cover, which framework comprises a pivotable main bow, which is moveable between a pivoted-up position and a pivoted-down position, and a pivotable rear bow for moving a rear section of the folding roof, wherein said hydraulic actuating unit comprises a hydraulic main bow actuator for pivoting the main bow and a hydraulic rear bow actuator for pivoting the rear bow, the main bow actuator and the rear bow actuator being of the double-acting type, each having a first and a second variable working chamber, which are delimited by a piston of the hydraulic actuator in question, and wherein the hydraulic actuating unit also comprises at least one actuable two-position control valve, which control valve has an outlet port, an inlet port and a reservoir port, the outlet port being connected to a working chamber of the main bow actuator and/or a working chamber of the rear bow actuator, and which control valve, in a first position thereof, connects the associated outlet port to the reservoir port and, in a second position thereof, connects the associated outlet port to the inlet/port of the control valve, and wherein the hydraulic actuating unit has two hydraulic connection ports, namely a first connection port, which is in communication with the inlet port of at least one actuable two-position control valve, and a second connection port, which is in communication with the reservoir port of each control valve, wherein the first connection port and the second connection port of the hydraulic actuating unit are each provided with a coupling element for coupling said connection port to a corresponding coupling element, which is in communication with a hydraulic circuit, in which at least one hydraulic pump/reservoir unit is incorporated, said pump/reservoir unit being adapted for mounting in the motor vehicle at a distance from the hydraulic actuating unit which is integrated in the folding roof unit, and wherein said hydraulic pump/reservoir unit comprises at least one reservoir for hydraulic fluid and a pump which is connected to the reservoir for delivering pressurized hydraulic fluid, and wherein in the hydraulic actuating unit the reservoir port of each control valve is also connected to the first connection port, and wherein a valve element with a non-return valve action opening towards the relevant connection port is provided in the connection between each reservoir port and the first connection port and in the connection between each reservoir port and the second connection port.

2. An hydraulic actuating unit according to claim 1, in which the hydraulic actuating unit includes a first and a second actuable two-position control valve each having an inlet port and an outlet port, in which the first connection port is in communication with the inlet ports of the first and second actuable two-position control valves, and in which the second connection port is in communication with the reservoir ports of the control valves.

3. A hydraulic actuating unit according to claim 1, in which the hydraulic actuating unit includes a first and a second actuable two-position control valve each having an inlet port and an outlet port, in which the first connection port is in communication with the inlet ports of the first and second actuable two-position control valves, and in which the second connection port is in communication with the reservoir ports of the control valves, and in which the outlet ports of the first and second control valves are respectively connected to the first and second working chambers of the main bow actuator.

4. Hydraulic actuating unit according to claim 1, in which the second connection port is in direct communication with a working chamber of the main bow actuator and/or the rear bow actuator.

5. Hydraulic actuating unit according to claim 1, in which the hydraulic actuating unit includes a first and a second actuable two-position control valve each having an inlet port and an outlet port, in which the first connection port is in communication with the inlet ports of the first and second actuable two-position control valves, and in which the second connection port is in communication with the reservoir ports of the control valves, and in which the hydraulic actuating unit also comprises a hydraulic AND valve having a first and a second inlet port and having an outlet port, in which the inlet ports of the AND valve are respectively connected to the outlet port of the first actuable two-position control valve and of the second actuable two-position control valve, and in which the outlet port of the AND valve is connected to a working chamber of the main bow actuator and/or the rear bow actuator.

6. Hydraulic actuating unit according to claim 1, in which the hydraulic actuating unit includes a first and a second actuable two-position control valve each having an inlet port and an outlet port, in which the first connection port is in communication with the inlet ports of the first and second actuable two-position control valves, and in which the second connection port is in communication with the reservoir ports of the control valves, and in which the hydraulic actuating unit also comprises a hydraulic AND valve having a first and a second inlet port and having an outlet port, in which the inlet ports of the AND valve are respectively connected to the outlet port of the first actuable two-position control valve and of the second actuable two-position control valve, and in which the outlet port of the AND valve is connected to a working chamber of the main bow actuator and/or the rear bow actuator, and in which the outlet port of the AND valve is connected to the first working chamber of the rear bow actuator, and in which the connection port is directly connected to the second working chamber of the rear bow actuator.

7. Hydraulic actuating unit according to claim 1, in which a non-return valve which opens in a direction towards the relevant connection port is provided between the first connection port and each of the reservoir ports and between the second connection port and each of the reservoir ports.

8. Hydraulic actuating unit according to claim 1, in which a non-return valve which opens in a direction towards the relevant connection port is provided between the first connection port and each of the reservoir ports and between the second connection port and each of the reservoir ports, and in which the reservoir ports of the first and second control valves are connected to a common reservoir line, which, in each case via a non-return valve, is connected to the first connection port and to the second connection port.

9. Hydraulic actuating unit according to claim 1, in which, at the inlet port of each control valve, there is a non-return valve, which closes in the direction towards the first connection port and the second connection port, or in which a non-return valve action of this type is integrated in each control valve.

10. Hydraulic actuating device comprising a hydraulic actuating unit according to claim 1, as well as a pump/reservoir unit, which is mountable at a distance from the said actuating unit in a motor vehicle, and an associated hydraulic circuit, the hydraulic pump/reservoir unit and/or the associated hydraulic circuit being adapted to connect the pump on command to the first connection port or the second connection port of the hydraulic actuating unit, the other connection port then being connected to the reservoir.

11. Hydraulic actuating device according to claim 10, in which the pump of the hydraulic pump/reservoir unit is a reversible pump having a first and a second suction/pressure port, which are each connected, via an associated line, to a suction shuttle valve, which is in communication with the reservoir, it being possible for the first suction/pressure port to be connected to the first connection port and for the second suction/pressure port to be connected to the second connection port of the hydraulic actuating unit.

12. Hydraulic actuating device according to claim 10, in which the actuating device comprises a third hydraulic actuator, which differs from the main bow actuator and the rear bow actuator and is not or does not become integrated in the preassembled folding roof unit, the third hydraulic actuator in particular being a tonneau-cover actuator for moving a tonneau-cover for a compartment in which the opened folding roof is accommodated, which third actuator is incorporated in or can be connected to the hydraulic circuit in which the pump/reservoir unit is incorporated.

13. Hydraulic actuating device according to claim 10, in which the actuating device comprises a third hydraulic actuator, which differs from the main bow actuator and the rear bow actuator and is not or does not become integrated in the preassembled folding roof unit, the third hydraulic actuator in particular being a tonneau-cover actuator for moving a tonneau-cover for a compartment in which the opened folding roof is accommodated, which third actuator is incorporated in or can be connected to the hydraulic circuit in which the pump/reservoir unit is incorporated, and in which the third actuator is of the double-acting type, having a first and a second variable working chamber, which are separated from one another by a piston.

14. Hydraulic actuating device according to claim 10, in which the pump of the hydraulic pump/reservoir unit is a reversible pump having a first and a second suction/pressure port, which are each connected, via an associated line, to a suction shuttle valve, which is in communication with the reservoir, it being possible for the first suction/pressure port to be connected to the first connection port and for the second suction/pressure port to be connected to the second connection port of the hydraulic actuating unit, and in which the actuating device comprises a third hydraulic actuator not for integration into the preassembled folding roof unit, the third hydraulic actuator being connectable to the hydraulic circuit in which the pump/reservoir unit is incorporated, and in which the third actuator is of the double-acting type, having a first and a second variable working chamber, which are separated from one another by a piston, and in which the first and second working chambers of the third actuator are both connected to the first or second suction/pressure port of the pump, and in which an actuable two-position control valve, which in a first position connects the working chamber to the reservoir and in a second position connects the working chamber to the relevant suction/pressure port, is accommodated in the connection between one of the working chambers of the third actuator and the relevant suction/pressure port of the pump.

15. Preassembled folding roof unit, which is adapted to be arranged, in the preassembled state, as a single unit on the body of a motor vehicle, which preassembled folding roof unit comprises a folding roof with a foldable cover and with a framework for the cover, the framework comprising a pivotable main bow, which can move between a pivoted-up position and a pivoted-down position, and a pivotable rear bow for moving a rear section of the folding roof, and in which preassembled folding roof unit a hydraulic actuating unit according to claim 1 is integrated.

16. Folding-roof installation which can be mounted on a motor vehicle, comprising, in combination, the preassembled folding-roof unit according to claim 15 and the hydraulic circuit which can be connected thereto and in which a pump/reservoir unit is incorporated.

17. Motor vehicle provided with a folding-roof installation according to claim 16, in which the pump/reservoir unit is mounted at a distance from the hydraulic actuating unit.

* * * * *